United States Patent [19]

Butler

[11] 4,145,775

[45] Mar. 27, 1979

[54] WATER SAVING DEVICE FOR WATER CLOSET

[75] Inventor: James L. Butler, Westlake Village, Calif.

[73] Assignee: American Water Engineering Corporation, Los Angeles, Calif.

[21] Appl. No.: 869,503

[22] Filed: Jan. 16, 1978

[51] Int. Cl.² ............................................. E03D 1/00
[52] U.S. Cl. ............................................. 4/415; 4/1; 4/324; 137/441
[58] Field of Search ............ 4/324, 415, 366, 331, 4/1; 138/44, 40, 46, 45; 137/441, 436; 251/118

[56] References Cited

U.S. PATENT DOCUMENTS

| 2,917,271 | 12/1959 | Banks | 138/46 UX |
| 3,086,546 | 4/1963 | Brown | 137/441 X |
| 3,562,782 | 2/1971 | Zychal | 138/46 |
| 3,744,064 | 7/1973 | Preston | 4/366 X |
| 3,799,132 | 3/1974 | MacGuire | 138/46 |
| 3,902,201 | 9/1975 | Bobo | 4/366 X |

*Primary Examiner*—Henry K. Artis
*Attorney, Agent, or Firm*—Keith D. Beecher

[57] ABSTRACT

A water saving device is provided in the form of a flow control valve, which may be installed in the refill tube for the toilet bowl of a water closet, and which may be adjusted to establish the proper amount of refill water to flow into the toilet bowl after each flush, so as to avoid wastage. The device, in one of its embodiments, may be installed in the refill tube of an existing water closet. The device can also be mounted directly on the main toilet valve unit as a built-in item for newly manufactured toilets.

2 Claims, 2 Drawing Figures

U.S. Patent  Mar. 27, 1979  4,145,775
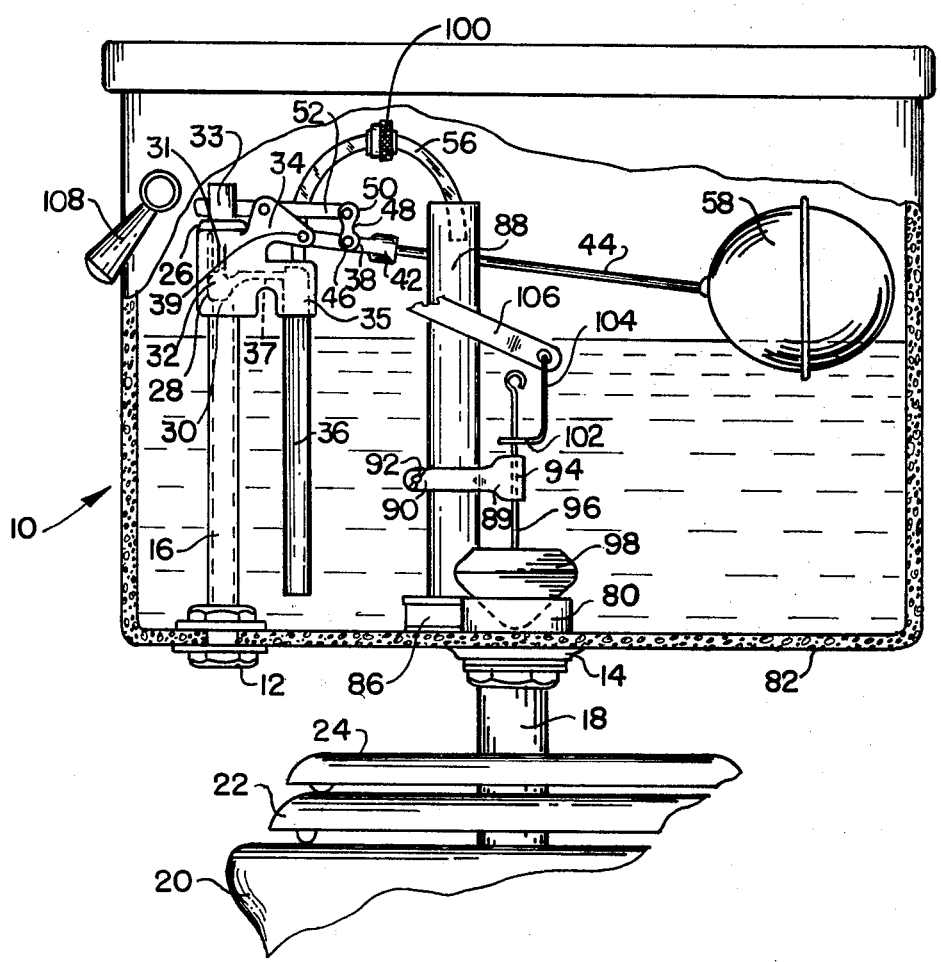
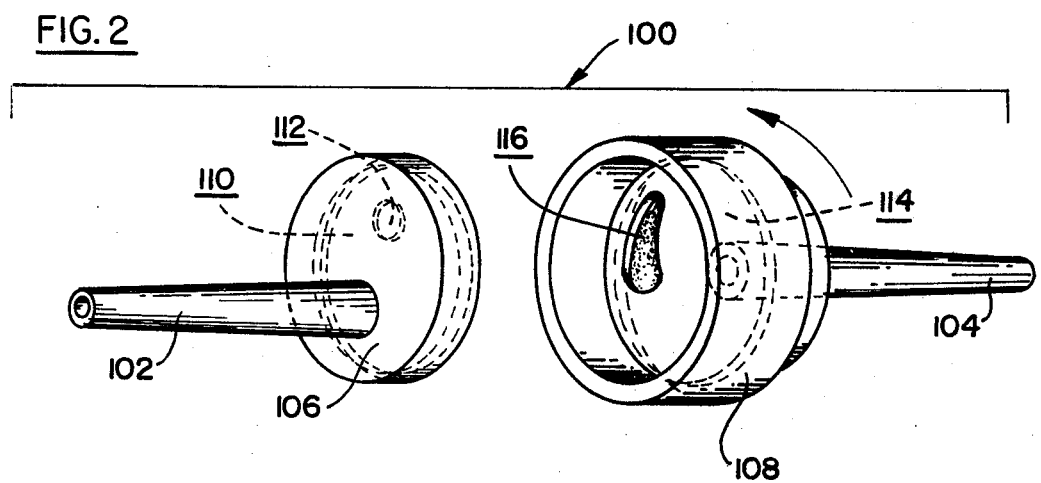
FIG. 2

WATER SAVING DEVICE FOR WATER CLOSET

BRIEF DESCRIPTION OF THE DRAWING

FIG. 1 is a part side elevation and part sectional view of a water closet bowl and tank, parts being shown broken away, and showing the position of the parts when a predetermined amount of water is stored in the tank; and FIG. 2 is a perspective detached view of the flow control valve of the present invention in one of its embodiments.

DETAILED DESCRIPTION

Referring now to the drawing, in FIG. 1 there is shown a conventional water closet tank which may be formed of matal, plastice, vitreous china, or the like. The tank is provided with an inlet 12 extending through its bottom adjacent to one side thereof, and with an outlet 14 extending through its bottom at a central position in the tank. A conduit 16 is positioned in the inlet 12 inside the tank, and this conduit is adapted to be connected to a pressurized water source. A discharge or outlet pipe 18 is connected at its top end to the discharge outlet 14, and this pipe 18 is connected at its bottom end to a conventional toilet bowl 20. The bowl 20 is provided with a conventional toilet seat 22 and cover 24.

An intake valve is mounted on the top of the intake conduit 16, the intake valve including a valve casing 26 with a vertically disposed bore 28 therein, and with a valve seat 30 at the bottom of the bore. A valve stem 31 has a ball valve 32 connected thereto, seated against seat 30, and the stem has its opposite end connected to a sliding piston 33 mounted in the bore 28 of the valve casing.

The valve casing 26 is formed with a trianglar-shaped arm 34 extending into the tank and with a downwardly extending opening outlet 35 connected to bore 28 by a bypass 37 and closet filling tube 36. As show, the tube 36 extends downwardly with its open end spaced from the bottom of the tank in order to prevent splashing of the water and noise when the tank is filling by discharge beneath the surface of the water stored in the tank.

A lever 38 has one end pivotally connected by means of a pivot pin 39 to the free corner of the arm 34, the other end of the lever being formed with a socket 42. One end of the float rod 44 is secured in the socket 42. A ball float 58 is connected to the other end of the float rod 44. Pivoted at 46 to the lever 38 is a link 48, the link being pivoted at its other end, as indicated at 50, to a lever 52. The lever 52 is pivotied midway between its ends to the arm 34, and is pivoted at its other end to the piston 33. The piston 33 controls the flow of liquid through the valve in the usual manner. A downwardly curved tube 56 is coupled to the top of the outlet 38, and the other end of tube 56 extends down into overflow pipe 88 to discharge refill water through the overflow pipe into the toilet bowl after each flush, and when the tank is practically empty.

A valve seat 80 is mounted on the bottom wall 82 of tank 10 around the outlet 14, and a laterally extending pan-like seat 86 is formed integrally with the seat 80 for supporting the overflow pipe 88. A bracket 94 is removably supported on the overflow pipe 88 intermediate its ends. The bracket includes a bifurcated end 90 and circling the overflow tube and fastened thereto by a wing nut 92. The other end of the bracket is formed with a vertically disposed integral seat portion 94. A valve stem 96 extends loosely through the sleeve and carries a frusto-conical shaped ball 98 on its bottom end. The ball is adapted to fit upon the valve seat 80, and it serves to prevent the water from escaping downwardly through the discharge outlet 14. The other end of stem 96 is formed with a loop 100 which is adapted to interlock with and limit movement of the loop end 102 of a link 104 fastened to one end of a tiltably supported elongated lever 106, the other end of the lever being operatively connected to an actuating handle 108 mounted on the outside of the tank. In operation, when the water is low in the tank, and when the ball 58 has descended to its lowermost position, the lever 38 is moved to draw the link 48 to the right in FIG. 1, to swing lever 52 around its pivot point and thereby cause piston 33 to move the valve from its seat and permit the water to flow through the supply pipe 16 and through the valve casing into the filling pipe 36, and from the pipe 36 into the tank. When the ball float 58 rises, the valve ball 32 in the valve casing 26 is gradually closed upon its seat 30, such closing being assisted by the force of the water.

As stated above, when the tank 10 is practically empty, and the float ball 58 is adjacent the bottom of the tank, a quantity of refill water is caused to pass through the tube 56 and through the overflow pipe 88 into the toilet bowl. The usual toilet design is such that too much refill water is passed into the toilet bowl during each refill operation, so that substantial water wastage occurs.

In accordance with concepts of the present invention, a flow control valve 100 is interposed into the tube 56. The valve 100 may easily be fitted into the tube 56, merely by cutting the tube and inserting the illustrated hollow tapered stems 102 and 104 (FIG. 2) into the resulting ends of the tube 56. These tapered stems permit the members 106 and 108 to which they are attached to be fitted in a watertight relationship with tube 56 for a wide range of diameters of the tube.

The flow control valve shown in FIG. 2 comprises, for example a two-piece injection molded plastic assembly formed by the two members 106 and 108, the two members being fitted together in a snap-fit relationship. The members 106 and 108 are rotatable relative to one another. Member 106 includes an internal chamber 110 formed by an intermediate wall in member 106, and which has an aperture 112 in the intermediate wall. The member 108 likewise has an internal chamber 114 which has a tapered slot 116 in the intermediate wall forming the latter chamber.

When the assembly 100 of FIG. 2 is in place in the tube 56 of FIG. 1, the two members 106 and 108 may be rotated relative to one another so that the aperture 112 has a particular position with respect to the tapered slot 116. It is evident that as the aperture 112 is turned toward the tapered end of the slot 116, a progressively decrease flow of water through the valve is achieved. Accordingly, the assembly 100 may be adjusted by rotating the two members 106 and 108 relative to one another until exactly the proper amount of refill water flows into the toilet bowl 20 after each flush, and there is no wastage due to excessive refill water being introduced into the bowl after each flush.

The particular embodiment of the invention shown in FIGS. 1 and 2 is appropriate for existing toilets, since it can be readily installed into an existing toilet merely by cutting the tube 56, and inserting the assembly 100 into the tube, as described above. A similar valve may be mounted directly on the valve casing 26, for newly constructed toilets, with the valve being readily accessible for adjustment to control the amount of refill water flowing through the tube 56.

While a particular embodiment of the invention has been shown and described, modifications may be made. It is intended in the claims to cover the modifications which come within the true spirit and scope of the invention.

What is claimed is:

1. In a water closet including a toilet bowl, and a toilet tank for supplying flush water to the bowl said tank having outlet means including a tubular conduit for supplying refill water to the bowl after each flush, an adjustable valve interposed in said conduit for controlling the amount of refill water supplied to said outlet means after each flush, said adjustable valve including a first housing member and a second housing member rotatable with respect to one another, one of the housing members having an intermediate wall with an aperture therein, and the other housing member having an intermediate wall with a tapered slot therein positioned relative to the aperture so that the flow of water through the valve is dependent upon the relative angular positions of the first and second housing members.

2. In the water closet defined in claim 1, and in which the housing members are formed of plastic material and are mounted in snap fit relationship with one another.